United States Patent [19]

Ohmura et al.

[11] 4,318,834
[45] Mar. 9, 1982

[54] METHOD FOR PRODUCING AN AQUEOUS LIQUID DISPERSION OF POLYMERS

[75] Inventors: Hiroshi Ohmura, Chita; Masaharu Nakayama, Nagoya, both of Japan

[73] Assignee: Nippon Oil and Fats Company Limited, Tokyo, Japan

[21] Appl. No.: 192,161

[22] Filed: Sep. 29, 1980

[30] Foreign Application Priority Data

Oct. 2, 1979 [JP] Japan .................................. 54-127056
Oct. 12, 1979 [JP] Japan .................................. 54-131528
Mar. 22, 1980 [JP] Japan .................................. 55-36516

[51] Int. Cl.$^3$ .................................................. C08L 73/00
[52] U.S. Cl. .................................... 524/457; 525/539
[58] Field of Search ..................... 525/298, 299, 539; 528/392, 393, 370, 425, 271; 260/29.6 RW

[56] References Cited

U.S. PATENT DOCUMENTS 3,592,948  7/1971  Bafford .............................. 525/384
4,283,512  8/1981  Matsushima ....................... 525/438

Primary Examiner—Paul R. Michl
Attorney, Agent, or Firm—Blanchard, Flynn, Thiel, Boutell & Tanis

[57] ABSTRACT

An aqueous liquid dispersion of polymers can be obtained by two steps of reaction comprising the first step of copolymerizing polymeric peroxide with vinyl type monomers, whereby copolymers having peroxy bonds therein are obtained and the second step of subjecting said copolymers having peroxy bonds therein to block copolymerization with vinyl type monomers which are different in kind from the one employed in the first step of reaction, whereby said copolymers having peroxy bonds therein are cleaved at the peroxy bonds thereof, thereby obtaining block copolymers with high efficiency.

11 Claims, No Drawings

METHOD FOR PRODUCING AN AQUEOUS LIQUID DISPERSION OF POLYMERS

BACKGROUND OF THE INVENTION

1. Field of the Invention

This invention relates to a process for producing an aqueous liquid dispersion of polymers.

2. Description of the Prior Art

An aqueous liquid dispersion of polymers is broadly useful as a water-based paint, printing ink, fiber processing aid, paper processing aid, leather processing aid, bonding agent and tackifier. The water-based paint is promising because it uses water so that there is no fear of pollution and exhaustion thereof.

One of the known methods for producing an aqueous liquid dispersion of polymers comprises subjecting vinyl-type monomers whose polymers are insoluble in water or a mixed solution of water and an aqueous organic solvent, to graft polymerization in the presence of a dispersion stabilizer which is soluble in water or a mixed solution of water and an aqueous organic solvent.

For example, as a dispersion stabilizer, there are mentioned maleinized polybutadiene, in Japanese Patent Publication No.SHO49-43381, water soluble unsaturated polyester in Japanese Patent Publication No.SHO 53-9795 and water soluble polymer in the molecule of which polymerizable vinyl groups are introduced, in Japanese Laid-Open Publication No.SHO53-17680.

These methods have faults in that the processes not only are complicated, but also, because the polymerization yield thereof in the block polymerization process is low, the reaction time thereof is long, the productivity is low and the dispersion stability and the storage stability of the liquid dispersion is bad. When maleinized polybutadiene or unsaturated polyester is employed as a dispersion stabilizer in producing a liquid dispersion, the resultant liquid dispersion has faults in that when it is used for e.g. painting, a uniform painted film can not be obtained with ease and the exterior durability thereof is bad.

SUMMARY OF THE INVENTION

An object of the present invention is to provide a method for producing an aqueous liquid dispersion of polymers which employs simple procedural steps and in which the block copolymerization efficiency is high.

Another object of the present invention is to provide a method for producing an aqueous liquid dispersion of polymers which possesses splendid dispersion stability, has a high concentration of solid matter and is low in viscosity.

A still further object of the present invention is to provide a method for producing an aqueous liquid dispersion of polymers which is useful for a coating composition whose cured film is splendid in smoothness and luster.

The present invention is based on the discovery that one kind of vinyl type monomers, the polymers of which are soluble in water or a mixed solution of water and an aqueous organic solvent (designated solvent C), is copolymerized with one or more polymeric peroxides, whereby peroxy bonds are introduced into the resultant copolymer and that a mixture of said copolymer having peroxy bonds therein and another kind of monomers, the polymers of which are insoluble in solvent C, is subjected to copolymerization, wherein said copolymer having peroxy bonds therein is cleaved at the peroxy bonds thereof, thus obtaining a block copolymer with high efficiency. Alternatively, one kind of vinyl type monomers, the polymers of which are insoluble in solvent C, is copolymerized with one or more polymeric peroxides, thus obtaining a copolymer and a mixture of said copolymers and another kind of vinyl type monomers, the polymers of which soluble in solvent C, is subjected to copolymerization, so that block copolymers likewise are obtained with high efficiency.

The present invention is based on the second discovery that the said block copolymer consists of one part of one kind of polymer which is soluble in solvent C and the other part of another kind of polymer which is insoluble in solvent C, and that when the block copolymer is mixed with solvent C, the insoluble part of the polymer of the block copolymer is coagulated in solvent C to form particles and the soluble part of the polymer of the block copolymer is elongated in solvent C, with the result that in the resultant mixture, particle like matters are in the dispersed state entirely.

The aqueous liquid dispersion of polymers, according to the present invention, is prepared by the following method.

The method for producing an aqueous liquid dispersion of polymers which comprises: copolymerizing one or more polymeric peroxides selected from a group consisting of the compounds having the following general formula (I) and (II), with one or more vinyl type monomers which are defined in the following definition (a) (designated as vinyl monomer A) or with one or more vinyl type monomers which are defined in the following definition (b) (designated as vinyl monomer B), thereby obtaining copolymers having peroxy bonds therein and subjecting said copolymers to block copolymerization with monomer A and/or B containing at least monomers which are different in composition from the vinyl type monomers employed in the first copolymerization, in the presence of a solvent which is water or a mixed solution of water and an aqueous organic solvent (designated as solvent C hereinafter). The parts of polymers derived from the vinyl type monomers of the copolymers having peroxy bonds therein obtained in the first copolymerization, or the parts of polymers derived from vinyl type monomers of the block copolymers obtained in the second copolymerization are dissolved in solvent C. When an aqueous organic solvent is employed as a solvent in the second copolymerization, the obtained solution of block copolymers alone is added with water, or it is added with water after removing the aqueous organic solvent therefrom

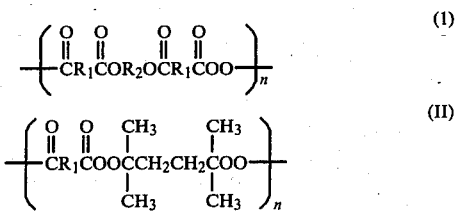

wherein $R_1$ is an alkylene group having 1 to 18 carbon atoms or a phenylene group, and $R_2$ is (1) an alkylene group having 2 to 10 carbons, (2) a group of the formula

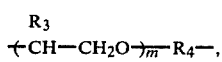

wherein $R_3$ is hydrogen or methyl, $R_4$ is an alkylene group having 2 to 10 carbon atoms and m is an integer of 1 to 13, (3)

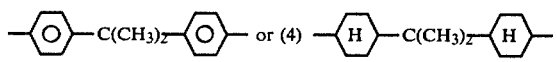

and $n=2$ to 20 definition (a); vinyl monomer A is one or more vinyl type monomers which is copolymerizable with the polymeric peroxides and the polymer of which is soluble in solvent C. definition (b); vinyl monomer B is one or more vinyl type monomer which is copolymerizable with the polymeric peroxides but the polymer of which is insoluble in solvent C.

Illustrative typical polymeric peroxides of the general formula (1) are the following;

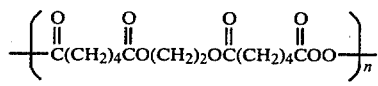

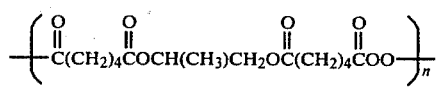

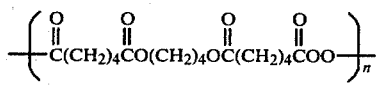

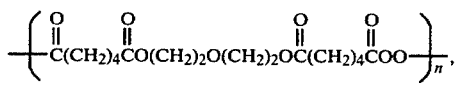

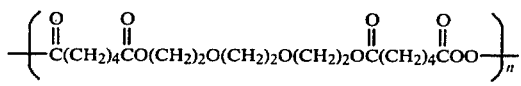

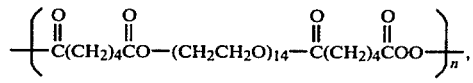

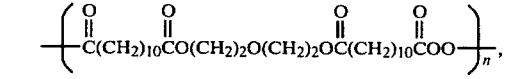

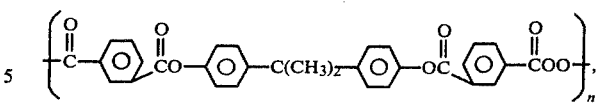

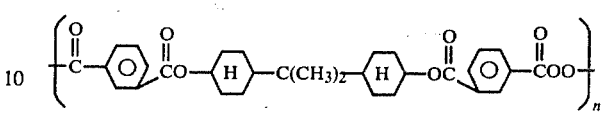

$n = 2$–$20$

Illustrative typical polymeric peroxides of the general formula (II) are the followings.

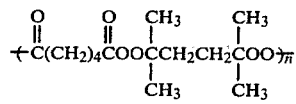

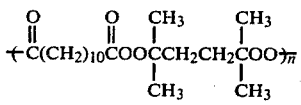

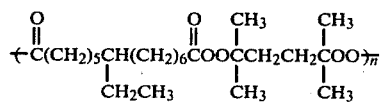

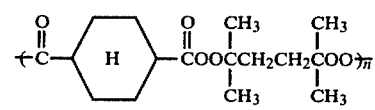

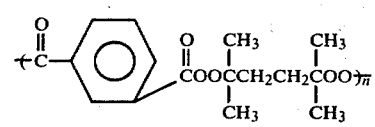

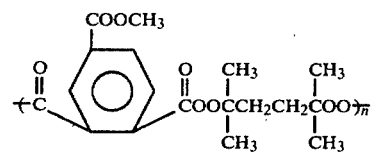

As the aqueous organic solvent employed in the present invention, there are mentioned solvents which are soluble with water in any proportion at room temperature, such as methyl alcohol, n-propyl alcohol, tert-butyl alcohol, methyl cellosolve, ethyl cellosolve, butyl cellosolve, methoxybutyl alcohol. methylcarbitol, ethylcarbitol, acetone, dioxane, methyl cellosolve acetate, carbitol acetate, and the like, and solvent whose solubility in water is 7–25 percent by weight, such as n-butyl alcohol, iso-butyl alcohol, sec-butyl alcohol, methyl ethyl ketone, methyl acetate, ethyl acetate, cellosolve acetate and the like.

In use of these solvents, they must be selected according to the water soluble polymer part of the block copolymer of the present invention and the solubility of the water insoluble polymer part of the same.

As the vinyl monomer A of the present invention, there are mentioned for example, polyethylene glycolester (metha)acrylates, [the term (metha)acrylate includes acrylate and methacrylate, and this definition applies hereafter] such as hydroxyethyl (metha)acrylate, 2-hydroxypropyl (metha)acrylate, 2-hydroxybutyl (metha)acrylate, diethylene glycolester mono (metha)acrylate, triethylene glycolester mono(metha)acrylate, pentaethylene glycolester mono(metha)acrylate and the like, and polypropylene glycolester mono(metha)acrylates such as dipropylene glycolester mono(metha) acrylate, tripropylene glycolester mono(metha)acrylate, pentapropylene glycolester mono(metha)acrylate and like, and derivatives of acryl amide such as (metha)acryl amide, N-methylol (metha)acryl amide, diacetone acryl amide, vinyl acetate and the like.

As the vinyl monomer B of the present invention, there are mentioned for example, butadiene, styrene, vinyl propionate, vinyl chloride, vinylidene chloride, (metha)acrylonitrile methyl(metha)acrylate, ethyl (metha)acrylate, n-propyl (metha)acrylate, isopropyl (metha)acrylate, butyl (metha)acrylate, isobutyl (metha)acrylate, tert-butyl (metha)acrylate, n-hexyl (metha)acrylate, cyclohexyl (metha)acrylate, benzyl (metha)acrylate, 2-ethylhexyl (metha)acrylate, lauryl (metha)acrylate, stearyl (metha)acrylate, glycidylester (metha)acrylate, methylglycidylester (metha)acrylate, (metha)allylglycidyl ether, vinyl toluene, vinyl pyrrolidone, dibutyl fumarate and the like.

Vinyl monomer A may be employed alone in the first copolymerization and in the second copolymerization, as the vinyl monomers to be block-copolymerized with the product obtained in the first copolymerization, vinyl monomer B may be employed alone, alternatively in the first copolymerization, vinyl monomer A may be employed with vinyl monomer B within the range that the part of the polymer derived from the vinyl type monomers of the block copolymer to be obtained in the second copolymerization, can be dissolved in the solvent C and as the vinyl monomers to be block copolymerized with the product obtained in the first copolymerization, vinyl monomer B is employed alone in the second copolymerization. Also the following combination of vinyl type monomers may be taken.

In the first copolymerization, as the vinyl monomers to be copolymerized with the polymeric peroxide, vinyl monomer A may be employed with vinyl monomers B within the range wherein the parts of the polymers which are derived from the vinyl type monomers of the block copolymers to be obtained in the second copolymerization, can be dissolved into solvent C, and in the second copolymerization, vinyl monomer A may be used in the range wherein the parts of the polymers which are derived from the vinyl type monomers of the block copolymers to be obtained in the second copolymerization, can not be dissolved in solvent C. Also in the first copolymerization, vinyl monomer B may be employed and in the second copolymerization, vinyl monomer A may be employed.

The mixing ratio of the vinyl monomer B to the vinyl monomer A is varied in conjunction with the combination of the two and accordingly can not be defined equally.

The vinyl monomer A is generally employed in the range of 0.1-50% by weight in the said mixture.

The copolymer having peroxy bonds in the molecule thereof is preferably obtained by copolymerizing 100 parts by weight of vinyl type monomer with 0.5-20 parts by weight of one or more polymeric peroxides selected from a group consisting of the compounds having the formulas (I) and (II) at a polymerization temperature of 60°-130° C. for a polymerization time of 2-5 hours.

In applying to the present invention, the aqueous organic solvent solution of the said copolymer having peroxy bonds therein was mixed with water and vinyl type monomers, and the resultant mixture was subjected to block copolymerization, whereby the desired aqueous liquid dispersion of polymers is obtained. Also, the aqueous organic solvent solution of the said copolymer having peroxy bonds therein from which the aqueous organic solvent was removed, was admixed with water and vinyl type monomers followed by subjecting the resultant mixture to block copolymerization, thereby obtaining the desired liquid dispersion of polymers whose dispersion medium is water only. The polymerization temperature of the block copolymerization reaction is preferably 60°-140° C. and the preferable polymerization time is 3-6 hours.

The mixing ratio of an aqueous organic solvent to water is preferably less than 80 wt %. The amount of solvent C is preferably 70-30 wt % based on the total amount of the aqueous dispersion of polymers.

The ratio of the amount of the soluble part of the block copolymer to the insoluble part of the block copolymer is not especially defined. In view of the stability of the aqueous liquid dispersion of polymers of the present invention, the amount of the polymer which is soluble in solvent C is preferably 5-70 wt % based on the amount of the total polymer part of the block copolymer.

The aqueous liquid dispersion of the present invention is very useful for a coating composition. If necessary, it can be mixed with other resin, pigments, fillers, or many kinds of conventional additives for the coating procedure. As the other resins, there are mentioned, melamine resin, epoxy resin, vinyl resin and the like.

According to the present invention, an aqueous liquid dispersion of polymers can be obtained by a relatively simple and easy procedure, wherein polymeric peroxides are copolymerized with vinyl type monomers, thus synthesizing copolymer having peroxy bonds therein and the resultant copolymer is subjected to block copolymerization with vinyl type monomers thereby cleaving the peroxy bonds thereof to produce the soluble or the insoluble part of the block copolymer directly.

According to the present invention, an aqueous dispersion of polymers which contains a high concentration of solid matters therein and which is very stable and whose viscosity is low, can be obtained, whereas it mainly consists of solvent C and a block copolymer comprising the polymer part thereof which is soluble in solvent C and the polymer part thereof which is insoluble in solvent C.

A coating composition which is prepared by employing the aqueous liquid dispersion of polymers, whose cured coating film is splendid in smoothness, can form a continuously coated film which is very lustrous.

PREFERRED EMBODIMENTS OF THE INVENTION

The term "part" and "%" shall mean parts by weight and "%" by weight hereinafter.

EXAMPLE 1

(A-1): Preparation of a polymer having peroxy bonds therein 20 parts of ethyl cellosolve were charged into a reaction vessel which was provided with a thermometer, a stirrer and a reflux and were heated to 75° C. while introducing nitrogen gas therein.

A mixed solution (1-1) having the following composition in parts

| Ethyl cellosolve | 30 |
|---|---|
| Hydroxyethyl methacrylate | 25 |
| $\left\{ \begin{array}{c} O \quad O \quad O \quad O \\ \| \quad \| \quad \| \quad \| \\ -C(CH_2)_4CO(CH_2)_4OC(CH_2)_4COO- \end{array} \right\}_n$ (n ≠ 5.5) | 5 | was charged slowly into the reaction vessel for one hour.

The content of the reaction vessel was subjected to polymerization for 1.5 hours. The obtained product contained 37.3% of copolymers having peroxy bonds therein and it was a transparent liquid. Its viscosity was 1.5 poise at 25° C.

This obtained product is designated as (A-1) product hereinafter.

(B-1): Preparation of an aqueous liquid dispersion of polymer 80 parts of water were introduced into a reaction vessel which was provided with a thermometer, a stirrer and a reflux and were heated to 80° C. while introducing nitrogen gas therein, wherein a mixed solution (1-2) having the following composition in part

| (A-1) product | 60 |
|---|---|
| Methyl methacrylate | 20 |
| Butyl acrylate | 20 |
| Styrene | 20 |
| Water | 60 | was dropped for 2 hours.

The resultant product was kept at 80° C. for 3 hours, thereby obtaining an aqueous liquid dispersion of polymers containing 31.4% of the block copolymers.

This liquid dispersion was milky and its viscosity was 0.5 poise at 25° C.

After this liquid dispersion was allowed to stand at 25° C. for 6 months, it was so stable that the particles therein did not precipitate and it did not separate into two phases and the viscosity thereof did not change.

This liquid dispersion was coated onto a mild steel plate to obtain a dried coating film of 30–40μ in thickness, following which it was forced to dry at 140° C., whereby a very lustrous and smooth film was obtained, wherein no appreciable phenomenon of foaming and flagging was observed.

EXAMPLE 2

(A-2): Preparation of a polymer having peroxy bonds therein

A polymer having peroxy bonds therein was prepared according to the same procedures as described in Example 1, except that isopropyl alcohol was employed in place of ethylcellosolve and a mixed solution (2-1) having the following composition in parts

| Butyl cellosolve | 30 |
|---|---|
| Hydroxyethyl acrylate | 15.75 |
| Diethylene glycolester monomethacrylate | 5.25 |
| Butyl acrylate | 4.0 |
| $\begin{array}{c} O \quad O \quad CH_3 \quad CH_3 \\ \| \quad \| \quad \| \quad \| \\ -C(CH_2)_4COOCCH_2CH_2COO- \\ \| \quad \| \\ CH_3 \quad CH_3 \end{array}$ (n ≠ 3.5) | 1.0 |
| $\begin{array}{c} O \qquad O \qquad\qquad\qquad O \qquad O \\ \| \qquad \| \qquad\qquad\qquad \| \qquad \| \\ -C-\!\bigcirc\!-CO-\!\bigcirc\!-C(CH_3)_2-\!\bigcirc\!-OC-\!\bigcirc\!-COO- \end{array}$ (n ≠ 3.6) | 3.5 | was employed in place of the mixed solution (1-1).

The obtained product contained 36.7% of the copolymers having peroxy bonds therein. The obtained product was a transparent liquid whose viscosity was 1.9 poise at 25° C.

(B-2): Preparation of an aqueous liquid dispersion of polymers 500 parts of n-hexane were charged into a vessel which was equipped with a stirrer, wherein 60 parts of (A-2) product was charged at room temperature with stirring. The obtained mixture was allowed to stand, thereby obtaining a white precipitate.

The white precipitate was separated, followed by drying at room temperature at reduced pressure, whereby a white powder of copolymers having peroxy bonds therein was obtained.

Into a reaction vessel which was provided with a thermometer, a stirrer and a reflux, there were charged with 60 parts of water and was heated to 80° C. while introducing nitrogen gas therein.

A mixed solution having the following composition

| (designated as mixed solution (2-2)) in parts | |
|---|---|
| White powder from (A-2) product | 20 parts |
| Methyl methacrylate | 30 |
| Butyl methacrylate | 40 |
| Styrene | 30 |
| Water | 40 | was charged into the reaction vessel for 2 hours.

The resultant product was further kept at 80° C. for 3 hours, thereby obtaining an aqueous liquid dispersion of polymer which contained 55.1% of the block copolymer.

This liquid dispersion was milky and its viscosity was 5.8 poise at 25° C. After this liquid dispersion was allowed to stand at 25° C. for 6 months, it was still stable and there was no recognition of precipitation of particles, separation of phase and change of its viscosity.

EXAMPLE 3

(A-3): (A-2) product was employed in Example 3

(B-3): Preparation of an aqueous liquid dispersion of polymers

An aqueous liquid dispersion of polymers was prepared according to the same procedures as that described in Example 2, except that a mixed solution having the following composition in parts (hereinafter designated as the mixed solution (3-2))

| | |
|---|---|
| White powder from (A-2) product | 20 |
| Methyl methacrylate | 30 |
| Butyl methacrylate | 30 |
| Styrene | 30 |
| Hydroxyethyl methacrylate | 10 |
| Water | 40 | was employed in place of the mixed solution (2-2).

The obtained product contained 54.5% of a block copolymer and its viscosity was 6.1 poise at 25° C. This liquid dispersion was a milky aqueous dispersion of polymers whose dispersion medium was water only.

After this liquid dispersion was allowed to stand at 25° C. for 6 months, it was so stable that the particles therein did not precipitate and it did not separate into two phases and its viscosity did not change.

EXAMPLE 4

(A-4): As a polymer having peroxy bonds therein, the (A-1) product was employed (B-4): Preparation of an aqueous liquid dispersion of polymers According to the same procedures as in the (B-1) procedure of Example 1, an aqueous liquid dispersion of polymers was prepared except that a mixed solution having composition in parts

| | |
|---|---|
| (A-1) product | 60 |
| Methyl methacrylate | 25 |
| Ethyl acrylate | 25 |
| Hydroxyethyl methacrylate | 9 |
| Acrylic acid | 1 |
| Water | 60 |

The obtained aqueous liquid dispersion contained 31.4% of the block copolymer and its viscosity was 0.5 poise at 25° C. and it was milky.

It was so stable that after it was allowed to stand at 25° C. for 6 months, the particles therein did not precipitate and did not separate into two phases and the viscosity thereof did not change at all.

The liquid dispersions obtained by Examples 2, 3 and 4 were examined respectively about the coating film according to the same procedures as in Example 1. The obtained films were respectively very lustrous and smooth, and there were no appreciable phenomenon of foaming and flagging in the respective films.

EXAMPLE 5-9

(A-5-9): Preparation of a copolymer having peroxy bonds therein

Copolymers having peroxy bonds therein were respectively prepared according to the same procedures as in the (A-1) process of Example 1, except that the solvents which are shown in Table 1 were respectively employed in place of 20 parts of ethyl cellosolve, and that the mixed solutions which are shown in Table 1 were respectively employed in place of the before mentioned mixed solution (A-1) and that the polymerization temperature of the copolymerization reaction was 100° C. in Example 6 and it was 90° C. in Example 7.

Wt % of the copolymer having peroxy bonds therein and the viscosity at 25° C. of the obtained products respectively are shown in Table 1.

(B-5-9): Preparation of aqueous liquid dispersion of polymers

Aqueous liquid dispersions of polymers were respectively prepared according to the same procedures as that described in Example 1 except that the mixed solutions as shown in Table 2 were respectively employed in place of the mixed solution (A-1), and that the polymerization temperature of the block copolymerization reaction was 105° C. in Example 6 and it was 95° C. in Example 7.

In Example 7, a white precipitate obtained by the process comprising mixing 60 parts of n-hexane and allowing the resultant mixture to stand, was employed in place of the (A-5-9) product.

After the aqueous liquid dispersions of polymers were obtained by Example 5-9 were respectively allowed to stand, at 25° C. for 6 months, they were so stable that their particles did not precipitate and they did not separate into two phases and their viscosity did not change at all.

Performance tests as a film former using the respective liquid dispersions were carried out according to the same procedures as in Example 1.

TABLE 1

| | | Example | | | | |
|---|---|---|---|---|---|---|
| | | 5 | 6 | 7 | 8 | 9 |
| Solvent[1] | Ethylcellosolve | 10 | 20 | — | 15 | — |
| | Isopropyl alcohol | — | — | 20 | — | — |
| | Methyl alcohol | — | — | — | — | 20 |
| Composition[2] of mixed solutions | Ethyl cellosolve | 15 | 30 | — | — | — |
| | Butyl cellosolve | — | — | 30 | 15 | — |
| | Methyl alcohol | — | — | — | — | 15 |
| | Isopropyl alcohol | — | — | — | 5 | — |
| | Vinyl acetate | — | — | — | — | 25 |
| | Hydroxyethyl acrylate | 25 | 18.75 | 18.75 | 20 | — |
| | Diethylene glycolester monomethacrylate | — | 6.25 | 6.25 | — | — |
| | N-methylol acrylamide | — | — | — | 5 | — |
| | 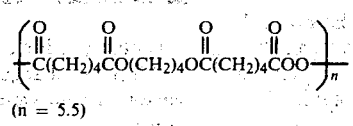 (n = 5.5) | — | — | — | 2.5 | 2.5 |

TABLE 1-continued

| | | Example | | | | |
|---|---|---|---|---|---|---|
| | | 5 | 6 | 7 | 8 | 9 |
| | $\left\{\begin{array}{c}\overset{O}{\underset{\|}{C}}(CH_2)_4\overset{O}{\underset{\|}{C}}O(CH_2)_2O(CH_2)_2O(CH_2)_2\\ -O\overset{O}{\underset{\|}{C}}(CH_2)_4\overset{O}{\underset{\|}{C}}OO\end{array}\right\}_n$ (n = 5.8) | 1.25 | — | — | — | — |
| | $\left\{\begin{array}{c}\overset{O}{\underset{\|}{C}}(CH_2)_4\overset{O}{\underset{\|}{C}}OO\overset{CH_3}{\underset{CH_3}{\overset{\|}{C}}}CH_2CH_2\overset{CH_3}{\underset{CH_3}{\overset{\|}{C}}}OO\end{array}\right\}_n$ (n = 3.5) | — | 3 | 1 | — | — |
| | $\left\{\begin{array}{c}\overset{O}{\underset{\|}{C}}-\langle O\rangle-\overset{O}{\underset{\|}{C}}O-\langle H\rangle-C(CH_3)_2-\langle H\rangle-O\overset{O}{\underset{\|}{C}}-\langle O\rangle-\\ \overset{O}{\underset{\|}{C}}OO\end{array}\right\}_n$ (n = 3.6) | — | — | 3.5 | — | — |
| Properties | Content of copolymers having peroxy bonds therein (wt %) | 51.1 | 35.8 | 36.7 | 43.9 | 43.5 |
| | Viscosity of solution of copolymers having peroxy bonds therein (25° C. poise) | 4.4 | 2.3 | 1.9 | 7.2 | 10.5 |

Note:
[1] Solvents were employed in respective Examples in place of 20 parts of ethyl cellosolve which was employed in Example 1
[2] Composition of mixed solutions employed in respective Examples in place of the mixed solution (A-1) in Example 1

TABLE 2

| | | Example | | | | |
|---|---|---|---|---|---|---|
| | | 5 | 6 | 7 | 8 | 9 |
| Composition[1] of a mixed solution (part) | Solution of copolymer having peroxy bonds therein | 60 | 60 | 60[2] | 60 | 60 |
| | Styrene | 12.5 | 25 | 43 | 43 | 45 |
| | Ethyl acrylate | 12.5 | — | — | — | 15 |
| | Butyl acrylate | — | 25 | 40 | 40 | 40 |
| | Hydroxyethyl methacrylate | 4.5 | 9 | 15 | — | — |
| | 2-Hydroxypropyl methacrylate | — | — | — | 15 | — |
| | Acrylic acid | 0.5 | 1 | 2 | 2 | — |
| | Water | 100 | 140 | 100 | 60 | 60 |
| Properties | Content of block copolymer in aqueous dispersion liquid of polymers | 31.8 | 31.3 | 54.8 | 57.1 | 56.9 |
| | Viscosity of aqueous liquid dispersion of polymer at 25° C. | 2.8 | 0.6 | 6.3 | 12.5 | 11.8 |

Note:
[1] Composition of mixed solutions employed respectively in Example 5-9 in place of the mixed solution (B-1)
[2] The mixed amount of powders of copolymer having peroxy bonds therein were obtained from the solution thereof All the obtained coating films were very lustrous and smooth. There were no appreciable phenomenon of foaming and flagging in the respective coating films.

EXAMPLE 10

(A-10): Preparation of a copolymer having peroxy bonds

Into the same reaction vessel as used in Example 1, there were charged 20 parts of ethyl cellsolve and they were heated to 75° C. while introducing nitrogen gas therein, wherein a mixed solution (10-1) having the following composition in parts

| Ethyl cellosolve | 30 |
|---|---|
| Hydroxyethyl methacrylate | 25 |
| $\left\{\overset{O}{\underset{\|}{C}}(CH_2)_4\overset{O}{\underset{\|}{C}}O(CH_2)_4O\overset{O}{\underset{\|}{C}}(CH_2)_4\overset{O}{\underset{\|}{C}}OO\right\}_n$ (n ≠ 5.5) | 5 | was charged little by little for one hour.

After the charge was over, the content of the reaction vessel was allowed to undergo copolymerization for 1.5 hours.

The resultant product contained 37.4% of the copolymer having peroxy bonds therein and its viscosity was 0.4 poise at 25° C. It was a transparent liquid.

(B-10): Preparation of an aqueous liquid dispersion of polymers

Into the same reaction vessel as used in the (B-1) process of Example 1, there were charged 20 parts of ethyl cellosolve and they were heated to 80° C. while introducing nitrogen gas therein, wherein a mixed solution (2-10) having the following composition in parts

| (A-10) product | 60 |
| Methyl methacrylate | 20 |
| Butyl acrylate | 20 |
| Styrene | 20 | was charged little by little for 2 hours.

The content of the reaction vessel was maintained at 80° C. for 3 hours, whereby a dispersion of copolymers was obtained. The obtained liquid was added with 120 parts of water, thereby obtaining a milky aqueous liquid dispersion of polymers which contained 31.5% of block copolymers and whose viscosity was 0.3 poise at 25° C. and whose dispersion medium was water and ethyl cellosolve.

It was so stable that after it was allowed to stand at 25° C. for 6 months, the particles thereof did not precipitate and it did not separate into two phases and the viscosity thereof did not change.

(A-11): Preparation of a copolymer having peroxy bonds therein

According to the same procedures as that described in (A-10) process of Example 10, a copolymer having peroxy bonds therein was prepared except that in the first step of the (A-10) process, 20 parts of isopropyl alcohol was employed in place of 20 parts of ethyl cellosolve and that a mixed solution (11-1) having the following composition

| Butyl cellosolve | 30 |
| Hydroxyethyl acrylate | 15.75 |
| Diethylene glycolester monomethacrylate | 5.25 |
| Butyl acrylate | 4.0 |
| | 1.0 |

$$\left( \begin{array}{c} O \\ \parallel \\ -C(CH_2)_4COO \end{array} \begin{array}{c} O \\ \parallel \\ CCH_2CH_2COO \end{array} \begin{array}{c} CH_3 \\ | \\ | \\ CH_3 \end{array} \begin{array}{c} CH_3 \\ | \\ | \\ CH_3 \end{array} \right)_n$$

(n = 3.5)

$$\left( \begin{array}{c} O \\ \parallel \\ -C \end{array} \langle O \rangle \begin{array}{c} O \\ \parallel \\ CO \end{array} \langle H \rangle -C(CH_3)_2 -\langle H \rangle -OC \langle O \rangle \begin{array}{c} O \\ \parallel \\ COO \end{array} \right)_n \quad 3.5$$

(n = 3.6)

were employed in place of the mixed solution (A-10) and that the polymerization temperature of the copolymerization reaction was 90° C.

The resultant product contained 36.7% of copolymers having peroxy bonds therein. The viscosity thereof was 1.9 poise at 25° C. It was a transparent liquid.

(B-11): Preparation of an aqueous liquid dispersion of polymers

An aqueous liquid dispersion of polymers was prepared according to the same procedures as in (B-10) process of Example 10, except that in the first procedure of (B-10) process, 10 parts of ethyl cellosolve were employed in place of 20 parts of ethyl cellosolve and that a mixed solution (11-2) having the following composition in parts

| (A-10) product | 60 |
| Methyl methacrylate | 30 |
| Butyl methacrylate | 40 |
| Styrene | 30 | was employed in place of the mixed solution (B-10) and that the polymerization temperature of the block copolymerization was 95° C.

The resultant liquid dispersion of block copolymers was allowed to stand in 1700 parts of n-hexane while stirring, thereby obtaining a while precipitate.

The precipitate was filtered off, followed by drying it at reduced pressure at room temperature and grinding the same to a powder.

The obtained powder was added with 100 parts of water, thereby obtaining a milky white liquid dispersion of polymers which contained 55.0% of block copolymers and whose viscosity at 25° C. was 7.5 poise and whose dispersion solvent was water only.

It was so stable that after it was allowed to stand at 25° C. for 6 months, the particles thereof did not precipitate and it did not separate into two phases and the viscocity thereof did not change.

EXAMPLE 12

(A-12): (A-11) product was employed in Example 12

(B-12): Preparation of an aqueous liquid dispersion of polymers

An aqueous liquid dispersion of polymers was prepared according to the same procedures as in the (B-11) procedure of Example 11, except that a mixed solution (12-2) having the following composition in parts

| Powder obtained from (A-11) product | 60 |
| Methyl methacrylate | 30 |
| Butyl methacrylate | 30 |
| Styrene | 30 |
| Hydroxyethyl methacrylate | 10 | was employed in place of the mixed solution (11-2), thereby obtaining a milky white aqueous liquid dispersion of polymers and whose viscosity at 25° C. was 6.1 poise and whose dispersion solvent was water only.

It was so stable that after it was allowed to stand at 25° C. for 6 months, the particles thereof did not precipitate and it did not separate into two phases and the viscocity thereof did not change.

EXAMPLE 13

(A-13): The solution of the copolymers having peroxy bonds therein which was obtained in (A-10) procedure was employed (B-13): Preparation of an aqueous liquid dispersion of polymers An aqueous liquid dispersion of polymers was prepared according to the same procedures as in (B-10) procedure of Example 10, except that a mixed solution (13-2) having the following composition in parts

| (A-10) product | 60 |
|---|---|
| Methyl methacrylate | 25 |
| Ethyl acrylate | 25 |
| Hydroxyethyl methacrylate | 9 |
| Acrylic acid | 1 | was employed in place of the mixed solution (10-2).

The obtained liquid dispersion of block copolymers was added with 120 parts of water, thereby obtaining a milky white aqueous liquid dispersion of polymers which contained 31.5% of the block copolymer and whose viscosity was 0.3 poise at 25° C.

It was so stable that after it was allowed to stand at 25° C. for 6 months, the particles thereof did not precipitate and it did not separate into two phases and the viscosity thereof did not change.

The liquid dispersions obtained by Examples 11, 12 and 13 were respectively examined about the coating film thereof according to the same procedures as in Example 10.

All the obtained films were very lustrous and smooth and there were no appreciable phenomenon of foaming and flagging in the respective coating films.

EXAMPLE 14-18

(A-14-18): Preparation of a copolymer having peroxy bonds therein

Copolymers having peroxy bonds therein were respectively prepared according to the same procedures as in the (A-10) process of Example 10, except that the solvents which are shown in Table 3, were respectively employed in place of 20 parts of ethyl cellosolve and that as for the polymerization temperature of the copolymerization reaction, that of Example 14 was 90° C. and that of Example 16 was 100° C.

Wt% of the copolymer having peroxy bonds therein and the viscosity at 25° C. of the obtained products are respectively shown in Table 4.

(B-14-18): Preparation of aqueous liquid dispersion of polymers

Aqueous liquid dispersions of polymers were prepared according to the same procedures as that described in (B-10) procedure of Example 10, except that mixed solutions as shown in Table 4 were respectively employed in place of the mixed solution (10-2) and that as for the polymerization temparature of the block copolymerization, that of Example 14 was 95° C. and that of Example 16 was 105° C. and that the obtained liquid dispersions were respectively added with the amount of solvents as shown in Table 4 in Examples 14, 15, 17 and 18, and that in Example 16, the aqueous liquid dispersion of polymers was prepared by a process comprising keeping the obtained liquid dispersion of block copolymers which is referred in the foregoing, in n-hexane ten times as much as the same, thereby obtaining a white precipitate, decanting it, drying it at reduced pressure at room temperature, powdering it and mixing it with the amount of water as shown in Table 4.

TABLE 3

| | | Example 14 | Example 15 | Example 16 | Example 17 | Example 18 |
|---|---|---|---|---|---|---|
| Solvent[1] | Ethyl cellosolve | — | 10 | 25 | 15 | — |
| | Isopropyl alcohol | 20 | — | — | — | — |
| | Methyl alcohol | — | — | — | — | 20 |
| Composition[2] of a mixed solution | Ethyl cellosolve | — | 15 | — | — | — |
| | Butyl cellosolve | 30 | — | 25 | 15 | — |
| | Isopropyl alcohol | — | — | — | 5 | — |
| | Hydroxyethyl acrylate | 18.75 | 15 | 25 | 20 | — |
| | Hydroxyethyl methacrylate | — | 10 | — | — | — |
| | Diethylene glycol monomethacrylate | 6.25 | — | — | — | — |
| | Vinyl acetate | — | — | — | — | 25 |
| | N-methylol acryl amide | — | — | — | 5 | — |
| | $\left\{-\overset{O}{\underset{\|}{C}}(CH_2)_4 \overset{O}{\underset{\|}{C}} O(CH_2)_4 O \overset{O}{\underset{\|}{C}}(CH_2)_4 \overset{O}{\underset{\|}{C}} OO-\right\}_n$ (n ≠ 5.5) | — | — | — | 2.5 | 2.5 |
| | $\left\{-\overset{O}{\underset{\|}{C}}(CH_2)_4 \overset{O}{\underset{\|}{C}} O(CH_2)_2 O(CH_2)_2 O \overset{O}{\underset{\|}{C}} -(CH_2)_4 \overset{O}{\underset{\|}{C}} OO-\right\}_n$ (n ≠ 5.8) | — | 1.25 | — | — | — |
| | $\left\{-\overset{O}{\underset{\|}{C}}(CH_2)_4 \overset{O}{\underset{\|}{C}} OO\overset{CH_3}{\underset{CH_3}{\overset{\|}{C}}}CH_2CH_2\overset{CH_3}{\underset{CH_3}{\overset{\|}{C}}}COO-\right\}_n$ (n ≠ 3.5) | 1 | — | 4.5 | — | — |

TABLE 3-continued

|  |  | Example | | | | |
|---|---|---|---|---|---|---|
|  |  | 14 | 15 | 16 | 17 | 18 |
|  | $\left\{\begin{array}{c}\overset{O}{\underset{\|}{C}}-\underset{}{\bigcirc}-\overset{O}{\underset{\|}{CO}}-\underset{}{\bigcirc}-C(CH_3)_2-\underset{}{\bigcirc}-\overset{O}{\underset{\|}{OC}}-\underset{}{\bigcirc}-\overset{O}{\underset{\|}{COO}}\end{array}\right\}_n$ (n ≠ 3.6) | 3.5 | — | — | — | — |
| Properties | Content of copolymer having peroxy bonds therein (wt %) |  | 36.7 | 51.1 | 36.9 | 43.9 | 43.7 |
|  | Viscosity of solution of copolymers having peroxy bonds therein (at 25° C. poise) |  | 1.9 | 8.5 | 0.8 | 5.7 | 6.3 |

Note:
(1)Solvents were employed in respective Examples in place of 20 parts of ethyl cellosolve which was employed in Example 10
(2)Compositions of mixed solutions employed in respective Examples in place of the mixed solution (10-1) in Example 10.

TABLE 4

|  |  | Example | | | | |
|---|---|---|---|---|---|---|
|  |  | 14 | 15 | 16 | 17 | 18 |
| Composition(1) of a mixed solution | Solution of copolymer having peroxy bonds therein | 60 | 60 | 60 | 60 | 60 |
|  | Ethyl cellosolve | 20 | 10 | 10 | — | — |
|  | Isopropyl alcohol | — | — | — | 10 | — |
|  | Styrene | 25.8 | — | 43 | — | 60 |
|  | Methyl methacrylate | — | 12.5 | — | 25.8 | — |
|  | Butyl acrylate | 24 | 12.5 | 40 | 24 | — |
|  | Hydroxyethyl methacrylate | 9 | 4.5 | 15 | — | — |
|  | 2-Hydroxypropyl methacrylate | — | — | — | 9 | — |
|  | Acrylic acid | 1.2 | 0.5 | 2 | 1.2 | — |
| Liquid which was admixed with a liquid dispersion of block copolymers | Water | 120 | 80 | 100 | 45 | 45 |
|  | Aqueous organic solvent (Ethyl cellosolve) | — | 10 | — | — | — |
|  | Content of block copolymer in an aqueous liquid dispersion (wt %) | 31.3 | 31.8 | 55.0 | 50.5 | 50.3 |
| Property | Viscosity of liquid dispersion at 25° C.(poise) | 0.8 | 2.5 | 8.7 | 10.3 | 11.8 |

Note:
(1)Composition of a mixed solution which was employed in respective Examples in place of the mixed solution (10-2) which was employed in Example 10
(2)The amount of water which was added to the dried and powdered block copolymer which was separated from the liquid dispersion of the block copolymer The respective contents of the block copolymers in the obtained aqueous liquid dispersion of polymers and their viscosity at 25° C. are shown in Table 4.

After the aqueous liquid dispersions of polymers which were obtained by Examples 14–18, were allowed to stand at 25° C. for 6 months, they were so stable that their particles did not precipitate and they did not separate into two phases and their viscosity did not change at all.

They were examined about their coating film according to the same procedures as Example 10.

All the obtained coating films were very lustrous and smooth. There were no appreciable phenomenon of foaming and flagging in the respective coating films.

EXAMPLE 19

(A-19): Preparation of a copolymer having peroxy bonds therein

Into the same reaction vessel as used in Example 1, there were charged 20 parts of ethyl cellsolve and they were heated at 75° C. while introducing nitrogen gas therein, wherein a mixed solution (19-1) having the following composition in parts

| Ethyl cellosolve | 30 |
|---|---|
| Methyl methacrylate | 20 |
| Butyl acrylate | 20 |
| Styrene | 20 |
| $\left\{\begin{array}{c}\overset{O}{\underset{\|}{C}}(CH_2)_4\overset{O}{\underset{\|}{CO}}(CH_2)_4\overset{O}{\underset{\|}{OC}}(CH_2)_4\overset{O}{\underset{\|}{COO}}\end{array}\right\}_n$ (n ≠ 5.5) | 5 | was charged slowly for one hour.

After the charge was over, the content of the reaction vessel was subjected to polymerization for 1.5 hours.

The obtained product contained 56.3% of the copolymer having peroxy bonds therein and its viscosity was 3.5 poise at 25° C. It was a transparent liquid.

(B-19): Preparation of an aqueous liquid dispersion of polymers

Into the same reaction vessel as used in Example 1, there were charged 20 parts of ethyl cellosolve and they were heated to 80° C. while introducing nitrogen gas therein, wherein a mixed solution consisting of 115 parts of (A-19) product and 25 parts of hydroxyethyl methacrylate was charged for 2 hours.

The content of the reaction vessel was kept at 80° C. for 3 hours, thereby obtaining a solution of block copolymer.

The obtained solution was added with 120 parts of water, whereby a milky white aqueous liquid dispersion of polymers which contained 34.5 wt% of the block copolymer and whose viscosity was 0.6 poise at 25° C. and whose dispersion solvent was water and ethyl cellosolve.

It was so stable that after it was allowed to stand at 25° C. for 6 months, the particles thereof did not precipitate and it did not separate into two phases and the viscosity thereof did not change.

This liquid dispersion was coated onto a mild plate to obtain a dried coating film of 30-40μ in thickness, following which it was forced to dry at 140° C., whereby a very lustrous and smooth film was obtained, wherein no appreciable phenomenon of foaming and flagging was observed.

EXAMPLE 20

(A-20): Preparation of a copolymer having peroxy bonds therein

A copolymer having peroxy bonds therein was prepared according to the same procedures as that described in (A-19) process of Example 20 except that 20 parts of isopropyl alcohol were employed in place of 20 parts of ethyl cellosolve which were charged at first in the reaction vessel in (A-19) procedure of Example 19 and that a mixed solution having the following composition in parts

| | |
|---|---|
| Butyl cellosolve | 30 |
| Methyl methacrylate | 20 |
| Butyl methacrylate | 30 |
| Styrene | 20 |
| $\left\{\begin{array}{l}-C(CH_2)_4COOCCH_2CH_2-COO-\\\phantom{xxxxxx}\overset{O}{\|}\phantom{xxx}\overset{O}{\|}\phantom{xx}\overset{CH_3}{\|}\phantom{xxxxx}\overset{CH_3}{\|}\\\phantom{xxxxxxxxxxxxxx}CH_3\phantom{xxxxx}CH_3\end{array}\right\}_n$ (n = 3.5) | 1.0 |
| $\left\{-\overset{O}{\overset{\|}{C}}-\langle\text{O}\rangle-\overset{O}{\overset{\|}{C}O}-\langle H\rangle-C(CH_3)_2-\langle H\rangle-O\overset{O}{\overset{\|}{C}}-\langle\text{O}\rangle-COO-\right\}_n$ (n = 3.6) | 3.5 | was charged in place of the mixed solution (19-1) and that the polymerization temperature of the copolymerization reaction was 90° C.

The obtained product contained 59.7 wt.% of the copolymer having peroxy bonds therein and the viscosity thereof was 4.5 poise at 25° C. It was a transparent liquid.

(B-20): Preparation of an aqueous liquid dispersion of polymers

An aqueous liquid dispersion of polymers was prepared according to the same procedures as described in (B-19) procedure of Example 19, except that 10 parts of ethyl cellosolve was employed in place of 20 parts of ethyl cellosolve which were charged into the reaction vessel at first in (B-19) procedure, and that a mixed solution (20-2) having the following composition in parts

| | |
|---|---|
| (A-20) product | 124.5 |
| Hydroxyethyl acrylate | 20.75 |
| Diethylene glycolester monomethacrylate | 10.25 |
| Butyl acrylate | 4.0 | was employed in place of the mixed solution (19-2) and that the reaction temperature of the block copolymerization reaction was 95° C.

The obtained block copolymer solution was allowed to stand in 1700 parts of n-hexane at room temperature with stirring, thereby obtaining a white precipitate.

This liquid dispersion was so stable that after it was allowed to stand at 25° C. for 6 months, the particles thereof did not precipitate, it did not separate into two phases and the viscosity thereof did not change.

This liquid dispersion was examined about the coating film according to the same procedures as in Example 19, the obtained film was smooth and lustrous, and appreciable foaming and flagging were not observed in it.

EXAMPLE 21

(A-21): The copolymer having peroxy bonds therein which was obtained by procedure (A-20) of Example 20 was employed

(B-21): Preparation of an aqueous liquid dispersion of polymers

A liquid of block copolymer was prepared according to the same procedure as in procedure (B-20) of Example 20, except that a mixed solution (21-2) having the following composition in parts

| | |
|---|---|
| (A-21) product | 75 |
| Hydroxyethyl acrylate | 30 |
| Diethylene glycolester monoacrylate | 5 | was employed in place of the mixed solution (20-2).

The obtained liquid of block copolymer was applied to the same procedure as that described in the procedure (B-20) of Example 20, thereby obtaining an aqueous liquid dispersion of polymers which contained 52.1 wt. % of the block copolymers and which was a milky white liquid dispersion whose dispersion solvent was water only.

This liquid dispersion was applied to the coating test according to the some produres as in Example 19. The obtained film was splendid in smoothness and lustrousness.

Any appreciable foaming and flagging were not observed in it.

EXAMPLE 22

(A-22): The liquid of copolymers having peroxy bonds therein which was obtained by procedure (A-19)

(B-22): Preparation of an aqueous liquid dispersion of polymers

A liquid of block copolymer was prepared according to the same procedure as in procedure (B-19) of Example 19, except that a mixed solution (22-2) having the following composition in parts

| (A-22) product | 60 |
|---|---|
| Methyl methacrylate | 25 |
| Ethyl acrylate | 25 |
| Hydroxyethyl methacrylate | 9 |
| Acrylic acid | 1 | was employed in place of the mixed solution (19-2) of Example 19.

The obtained liquid of block copolymers was added with 120 parts of water, whereby an aqueous liquid dispersion of polymers was obtained.

The obtained milky white liquid dispersion contained 39.1 wt.% of the block copolymer and the viscosity thereof was 0.6 poise at 25° C. This liquid dispersion was so stable that after it was allowed to stand at 25° C. for 6 months, the particles thereof did not precipitate and it does not separate into two phases and the viscosity thereof did not change at all.

This liquid dispersion was examined about the coating film according to the same procedures as in Example 19.

The obtained film was splendid in smoothness and lustrousness and no appreciable phenomenon of foaming and flagging were observed in it.

EXAMPLE 23-27

(A-23-27): Preparation of a copolymer having peroxy bonds therein

Copolymers having peroxy bonds therein were respectively prepared according to the same procedures as in the process (A-19) of Example (A-19), except that the solvents which are shown in Table 5 were employed in place of 20 parts of ethyl cellosolve and that mixed solutions which are shown in Table 5 were employed respectively in place of the mixed solution (19-2) which were employed in Example 19 and that the polymerization temperature of the polymerization reaction was 90° C. in Examples 23 and 27, and it was 100° C. in Example 25.

The content of the copolymer having peroxy bonds therein in the respective obtained products and the viscosity thereof at 25° C. are shown in Table 5, (B-23-27): Preparation of aqueous liquid dispersions of polymers Aqueous liquid dispersions of polymers were respectively prepared according to the same procedures as in the procedure (B-19) of Example 19, except that the mixed solutions as shown in Table 6 were respectively employed in place of the mixed solution (19-2) and that the polymerization temperature of the block copolymerization reaction was 95° C. in Examples 23 and 27, and it was 105° C. in Example 25.

In Example 23, 26 and 27, the obtained solutions of block copolymer were respectively added with the amounts of water which are shown in Table 6.

In Example 24, the obtained solution of block copolymers was admixed with the amount of water and the aqueous organic solvent which are shown in Table 6.

In Example 25, the obtained solution of block copolymer was allowed to stand at 25° C. in n-hexane ten times as much as the said solution with stirring, thus obtaining a white precipitate and then it was decanted, dried at reduced pressure at room temperature, followed by admixing with the amount of water which is shown in Table 6, whereby the aqueous liquid dispersion was obtained.

The content of block copolymer in the obtained liquid dispersions of polymers and the viscosity thereof at 25° C. are respectively shown in Table 6.

The aqueous liquid dispersions of polymers obtained by Example 23-27 were all so stable that after they were allowed to stand at 25° C. for 6 months, the particles thereof did not precipitate and they did not separate into two phases and the viscosity thereof did not change at all.

They were examined about their coating films according to the same procedures as in Example 19. The obtained films were all splendid in smoothness and lustrousness.

No appreciable phenomenon of foaming and flagging were observed in them.

TABLE 5

|  |  | Example | | | | |
|---|---|---|---|---|---|---|
|  |  | 23 | 24 | 25 | 26 | 27 |
| Solvent[1] | Ethyl cellosolve | — | 10 | 35 | 15 | 20 |
|  | Isopropyl alcohol | 20 | — | — | — | — |
| Composition[2] of a mixed solution | Ethyl cellosolve | — | 15 | — | — | 30 |
|  | Butyl cellosolve | 30 | — | 35 | 25 | — |
|  | Isopropyl alcohol | — | — | — | 5 | — |
|  | Styrene | 25.8 | — | 43 | — | 25.8 |
|  | Methyl methacrylate | — | 12.5 | — | 25.8 | — |
|  | Butyl acrylate | 24 | 12.5 | 40 | 24 | 24 |
|  | Hydroxyethyl methacrylate | 9 | 4.5 | 15 | — | 9 |
|  | 2-Hydroxypropyl methacrylate | — | — | — | 9 | — |
|  | Acrylic acid | 1.2 | 0.5 | 2 | 1.2 | 1.2 |

TABLE 5-continued

| | | Example | | | | |
|---|---|---|---|---|---|---|
| | | 23 | 24 | 25 | 26 | 27 |
| | $\left(\begin{array}{c}\underset{\|}{O}\\-C(CH_2)_4CO(CH_2)_4OC(CH_2)_4COO-\\\underset{\|}{O}\end{array}\right)_n$ (n ≠ 5.5) | — | — | — | 2.5 | — |
| | $\left(-C(CH_2)_4COOCCH_2CH_2COO-\right)_n$ with CH$_3$ groups (n ≠ 3.5) | 1 | — | 4.5 | — | 1 |
| | $\left(-C(CH_2)_4CO(CH_2)_2O(CH_2)_2OC(CH_2)_4-COO-\right)_n$ (n ≠ 5.8) | — | 1.25 | — | — | — |
| | (aromatic peroxide structure) (n ≠ 3.6) | 3.5 | — | — | — | 3.5 |
| Property | Content of copolymer having peroxy bonds therein (wt %) | 56.1 | 55.3 | 59.7 | 58.1 | 56.2 |
| | Viscosity of solution of copolymer having peroxy bonds therein at 25° C. (poise) | 3.1 | 2.9 | 8.3 | 7.7 | 6.5 |

Note:
(1)Solvents employed in respective Examples in place of 20 parts of ethyl cellosolve
(2)Composition of a mixed solution employed in respective Examples

TABLE 6

| | | Example | | | | |
|---|---|---|---|---|---|---|
| | | 23 | 24 | 25 | 26 | 27 |
| Composition(1) of mixed solution | Solution of copolymer having peroxy bonds therein | 114.5 | 60 | 180 | 100 | 114.5 |
| | Ethyl cellosolve | 20 | 10 | 10 | — | 20 |
| | Isopropyl alcohol | — | — | — | 10 | — |
| | Hydroxyethyl acrylate | 30 | 15 | 30 | 20 | — |
| | Hydroxyethyl methacrylate | — | 5 | — | — | — |
| | Diethylene glycolester monomethacrylate | 5 | — | — | — | — |
| | N-methylol acryl amide | — | — | — | 5 | — |
| | Vinyl acetate | — | — | — | — | 35 |
| Liquids which was charged in procedures (B-23)-(B-27) | Water | 120 | 80 | 100 | 45 | 45 |
| | Aqueous organic solvent (Ethyl cellosolve) | — | 10 | — | — | — |
| Property | Content of block copolymer in an aqueous liquid dispersion | 34.1 | 29.5 | 42.8 | 45.9 | 46.2 |
| | Viscosity of liquid dispersion | 1.5 | 6.7 | 5.3 | 8.8 | 12.7 |

Note:
(1)Composition of a mixed solution employed in respective Examples in place of the mixed solution employed in Example 19.

The embodiments of the invention in which exclusive property or privilege is claimed are defined as follows:

1. A method for producing an aqueous liquid dispersion of polymers, which comprises: in a first copolymerization step, copolymerizing one or more polymeric peroxides selected from the group consisting of compounds having the formulas (I) and (II),

(I)

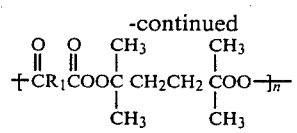
(II)

wherein $R_1$ is alkylene having 1 to 18 carbon atoms or phenylene, $R_2$ is (1) alkylene having 2 to 10 carbon atoms, (2) 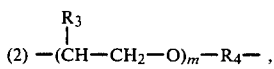

wherein $R_3$ is hydrogen or methyl, $R_4$ is alkylene having 2 to 10 carbon atoms, m is an integer of 1 to 13, (3) 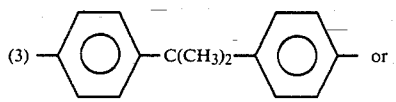 or (4) 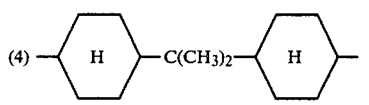

and n is from 2 to 20,
with a first monomer component consisting essentially of one or more vinyl monomers selected from the group consisting of (1) vinyl monomer A which is copolymerizable with said polymeric peroxides and polymers of which are soluble in a solvent C selected from the group consisting of water, organic solvents which are soluble in water, organic solvents whose solubility in water is from 7 to 25 percent by weight, and mixtures thereof, and (2) vinyl monomer B which is copolymerizable with said polymeric peroxides and polymers of which are insoluble in said solvent C, thereby obtaining copolymers having peroxy bonds therein; then, in a second copolymerization step, subjecting said copolymers having peroxy bonds therein to block copolymerization, in the presence of said solvent C, with a second monomer component consisting essentially of one or more of said vinyl monomers, which second monomer component is different in composition from said first monomer component used in the first copolymerization step, whereby to form a block copolymer in which the polymer blocks formed in one of said first and second copolymerization steps are dissolved in said solvent C and the polymer blocks formed in the other of said first and second copolymerization steps are insoluble in said solvent C and form dispersed particles therein.

2. A method as claimed in claim 1 in which said solvent C is said organic solvent and including the further step of mixing said block copolymer with water.

3. A method as claimed in claim 1 in which said solvent C is water.

4. A method as claimed in claim 1, claim 2 or claim 3, in which the first copolymerization step is carried out in the presence of said organic solvent so that said copolymers are obtained in the form of a solution in said organic solvent.

5. A method as claimed in claim 4, wherein in the first copolymerization step, the amount of said polymeric peroxide is from 0.5 to 20 parts by weight per 100 parts by weight of said first monomer component, the copolymerization temperature is from 60° to 130° C. and the polymerization time is from 2 to 5 hours, and, in the second copolymerization step, the block copolymerization temperature is from 60° to 140° C. and in which, in the aqueous dispersion, the mixing ratio of said organic solvent to water is less than 80%.

6. A method as claimed in claim 5, wherein vinyl monomer A alone is employed in the first copolymerization step as the first monomer component and vinyl monomer B alone is employed in the second copolymerization step as the second monomer component.

7. A method as claimed in claim 5, wherein in the first copolymerization step, the first monomer component is a mixture of vinyl monomer A and vinyl monomer B in proportions such that the polymer blocks formed therefrom are dissolved in said solvent C and in the second copolymerization step, as said second monomer component, vinyl monomer B alone is employed.

8. A method as claimed in claim 5, wherein in the first copolymerization step, the first monomer component is a mixture of vinyl monomer A and vinyl monomer B in proportions such that the polymer blocks formed therefrom are dissolved in said solvent C and in said second copolymerization step, as said second monomer component, a mixture of vinyl monomer B and vinyl monomer A is employed in proportions such that the polymer blocks formed therefrom are insoluble in said solvent C.

9. A method as claimed in claim 5, wherein in the first copolymerization step, as the first monomer component, vinyl monomer B alone is employed and in the second copolymerization step, as the second monomer component, vinyl monomer A alone is employed.

10. A method as claimed in claim 2 in which said solvent C is removed prior to mixing said block copolymer with water.

11. A method as claimed in claim 4 in which after the first copolymerization step and prior to said second copolymerization step, said organic solvent is removed from said copolymer.

* * * * *